March 1, 1932. L. E. DONALD 1,847,475
HOSE CLAMP
Filed Dec. 5, 1930
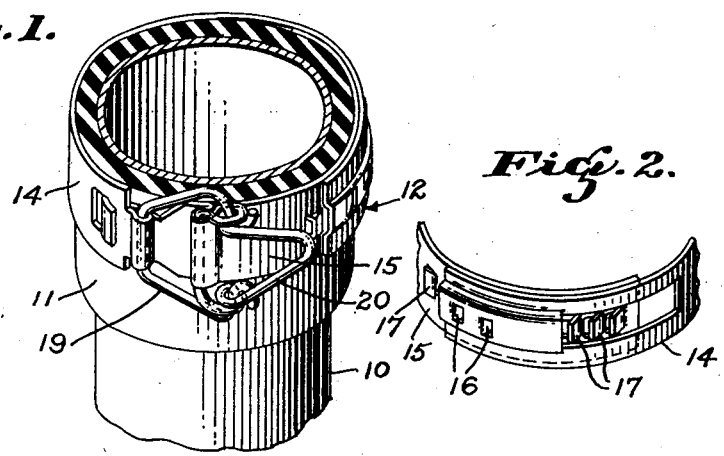
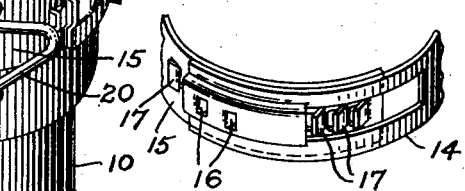
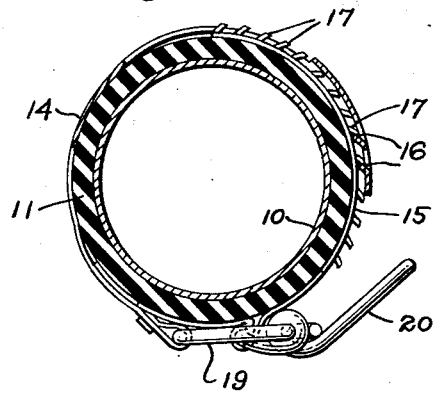
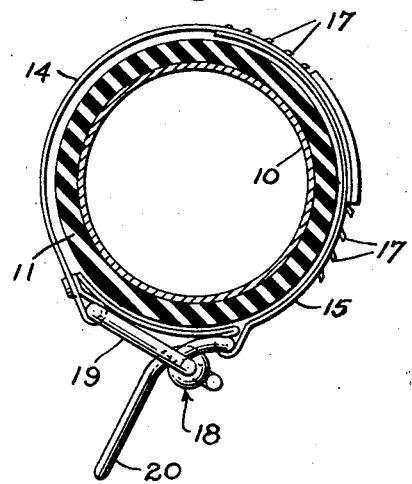
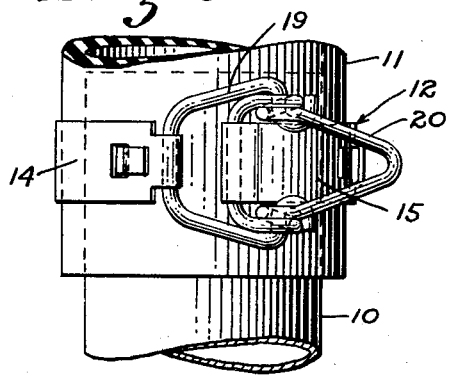
INVENTOR.
Louis E. Donald.
BY
Townsend, Loftus & Abbett
ATTORNEYS.

Patented Mar. 1, 1932

1,847,475

UNITED STATES PATENT OFFICE

LOUIS E. DONALD, OF OAKLAND, CALIFORNIA, ASSIGNOR OF ONE-THIRD TO GEORGE W. DONALD AND ONE-THIRD TO GEORGE D. BURPEE, OF OAKLAND, CALIFORNIA

HOSE CLAMP

Application filed December 5, 1930. Serial No. 500,284.

This invention relates to hose clamps.

It is the principal object of the present invention to provide a generally improved hose clamp of simple and inexpensive construction for use in connection with hose of different diameters and capable of being expeditiously contracted and expanded.

In practicing the invention, I provide a contractile band formed of two curved sections which extend through arcs greater than 180 degrees. At one end these sections are adjustably connected, so as to vary the diameter of the band. At the other end they are connected through the medium of a latching device which is operative to expand or contract the band. This latching device is capable of latching the band in clamping position.

One form which this invention may assume is exemplified in the following description and illustrated by way of example in the accompanying drawings, in which:

Fig. 1 is a perspective view of my improved hose clamp showing it mounted on a hose.

Fig. 2 is a fragmentary view in perspective showing the adjustable connection between the ends of the sections of the bands.

Fig. 3 is a view in plan of the clamp showing it in latching position and with portions thereof in section.

Fig. 4 is a view similar to Fig. 3, with the exception that the clamp is shown in expanded position.

Fig. 5 is a view in side elevation of the clamp showing the construction of the latching mechanism.

Referring more particularly to the accompanying drawings 10 indicates a metallic or other rigid tube over which a length of hose 11 or other conduit of yielding material is telescoped.

The present invention is particularly concerning with a clamp 12 which is provided for the purpose of tightly embracing the hose 11 to clamp it to the tube 10 forming watertight connection therebetween. The clamp 12 is preferably formed of flexible sheet metal and is composed of two curved sections. These sections are formed on the same radius and each extends through an arc greater than 180 degrees, so that when the sections are assembled to form a circular clamping band the ends thereof will overlap.

Inasmuch as the sections are formed of flexible material a circular clamping band of various diameters can be formed of the sections, so that the clamp will be applicable to hoses of different diameters within, of course, a reasonable range.

The sections are indicated on the drawings as 14 and 15. The section 14 is cut-away centrally and longitudinally forming a long, narrow slot extending lengthwise of the section and terminating short of the ends thereof. At one end the inner surface of the section is recessed, which recess is formed as a continuation of the slot just referred to. Intermediate the ends of this recess two downwardly projecting transverse lugs 16 are struck from the body of the section, which lugs 16 are adapted to engage transverse lugs 17 struck outwardly from the body of the section 15. The latter lugs are spaced at equal distances apart and project outwardly. The spacing between the lugs 17 is the same as between the lugs 16, so that the latter under some circumstances may engage the same. The width of the lugs 17 is less than the width of the recess and slot in the section 14 so as to project therein and permit the adjacent surfaces of the sections to engage.

It will be noticed that the lugs 17 are formed along a considerable portion of the length of the section 15, so that by adjusting the sections relatively a circular clamping band of different diameters may be formed.

The opposite ends of the sections are connected by a latching device 18. This latching device includes a bail 19 connected at its base to the terminal of the section 14. The legs of the bail 19 are pivotally connected at their terminals to a bail-shaped latch lever 20 which is pivotally connected at its base to the section 15 short of the end of the latter. This end of the section extends beyond the pivotal connection between the section and the lever 20 in order that it may overlap the adjacent end of the section 14.

It will be noticed from the drawings that the pivotal connections between the bail 19 and the lever 20 are formed by transverse sockets in the sections 14 and 15, with which base portions of the bail and lever are engaged. The pivotal connection between the bail 19 and lever 20 is at a point intermediate the ends of the lever, so that when the lever is moved in one direction the circular clamping band will be expanded, and when the lever is moved in the opposite direction the circular clamp will be contracted. As shown in the drawings I prefer that the bail 19 and the lever 20 be formed of wire, because this makes a practical and economical structure.

In operation of the device it is constructed and assembled as shown in the drawings and is mounted to embrace a hose. The sections are then relatively adjusted, so as to very loosely embrace the hose and the lugs 16 are placed in engagement with the proper lugs 17.

During this time the latching lever 20 is in a position maintaining the clamp expanded. As the lugs 16 are engaged with the proper lugs 17 the latching lever is moved to contract the clamp, the leverage being sufficient to enable a very tight clamping action to be obtained.

I desire to point out that when the lever is in clamping position the point of connection between bail 19 and the lever passes over the center of the pivotal connection between the lever and the bail, so as to prevent the lever from inadvertently moving to an enlarging position.

I desire to point out that the forming of the lugs 17 on the section 15 and the slot of the section 14 causes the band to engage the hose on two narrow surfaces which, of course, enables a tighter clamping action to be obtained.

From the foregoing it is obvious that I have provided a very simple and inexpensive hose clamp which may be quickly applied and released, which clamp will be comparatively inexpensive to manufacture and very efficient in operation.

While I have shown the preferred form of my invention, it is to be understood that various changes may be made in its construction by those skilled in the art without departing from the spirit of the invention as defined in the appended claim.

Having thus described my invention, what I claim and desire to secure by Letters Patent is:

A device of the character described comprising a circular band formed of a pair of curved flexible sheet metal members having ends overlapping each other, an adjustable connection between one pair of said overlapping ends, said adjustable connection comprising a plurality of lugs pressed from one of said members and extending outwardly therefrom, the other of said members having a recess formed therein to slidably receive said lugs, a raised portion adjacent said recess and lugs formed on said raised portion and engageable with said first named lugs to prevent relative movement between said pair of ends in one direction, the other pair of overlapping ends having, one, a loop formed at its end and the other being bent double to form a loop spaced from its end, and a toggle connection pivotally carried by said loops and capable of expanding the band or contracting the band and latching it in a contracted position.

LOUIS E. DONALD.